(12) United States Patent
Handelman et al.

(10) Patent No.: US 11,429,982 B2
(45) Date of Patent: Aug. 30, 2022

(54) IDENTIFYING CHANGES IN USER CHARACTERISTICS USING NATURAL LANGUAGE PROCESSING

(71) Applicant: PayPal, Inc., San Jose, CA (US)

(72) Inventors: Tomer Handelman, Tel Aviv (IL); Iulian-Corneliu-Ran Locar, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 320 days.

(21) Appl. No.: 16/732,155

(22) Filed: Dec. 31, 2019

(65) Prior Publication Data

US 2021/0201331 A1 Jul. 1, 2021

(51) Int. Cl.
*G06Q 30/00* (2012.01)
*G06F 40/40* (2020.01)
*G06N 20/00* (2019.01)
*G06Q 40/00* (2012.01)

(52) U.S. Cl.
CPC ......... *G06Q 30/0185* (2013.01); *G06F 40/40* (2020.01); *G06N 20/00* (2019.01); *G06Q 40/12* (2013.12)

(58) Field of Classification Search
CPC .... G06Q 30/0185; G06Q 40/12; G06N 20/00; G06F 40/40
See application file for complete search history.

(56) References Cited

U.S. PATENT DOCUMENTS

| | | | |
|---|---|---|---|
| 10,503,788 B1* | 12/2019 | Kumar | G06Q 30/0201 |
| 2015/0142888 A1* | 5/2015 | Browning | H04L 67/22 709/204 |
| 2017/0154295 A1* | 6/2017 | Fang | G06Q 50/01 |
| 2021/0065260 A1* | 3/2021 | Zheng | G06N 3/0454 |

* cited by examiner

*Primary Examiner* — Alvin L Brown
(74) *Attorney, Agent, or Firm* — Haynes and Boone, LLP (57) ABSTRACT

Methods and systems for identifying characteristics of a user (e.g., a seller) based on Natural Language Processing (NLP). Transaction data of buyers may be collected to generate a sequence paragraph of seller name information for each buyer. NLP techniques such as word2vec may be used to vectorize the seller name information to determine relationships between sellers. Industry information may be determined using the vectors. Reliability checks may be performed to determine whether the data is robust to label the determined data.

20 Claims, 10 Drawing Sheets

BUYER 1 :

ORDERS PLACED:

| 502A | 502B | 502C |
|---|---|---|
| SELLER_1 | SELLER_2 | SELLER_3 |

SEQUENCE PARAGRAPH: SELLER_1, SELLER_2, SELLER_3

BUYER 2:

ORDERS PLACED:

| 502D | 502E | 502F |
|---|---|---|
| SELLER_1 | SELLER_4 | SELLER_3 |

SEQUENCE PARAGRAPH: SELLER_1, SELLER_4, SELLER_3

IDENTIFYING CHANGES IN USER CHARACTERISTICS USING NATURAL LANGUAGE PROCESSING

TECHNICAL FIELD

The subject technology generally relates to natural language processing and more particularly, relates to modeling characteristics of user data using natural language processing.

BACKGROUND

Users of a web service or other technology platform may have various data associated with them. In some instances, a change in a user's characteristics may indicate a potential problem with that user, such as a security risk or other type of risk. In some instances, however, a lack of data about a particular user may make it quite difficult to predict whether that particular user is likely to encounter a problem. Applicant recognizes, however, that other similar users having related characteristic data may be indicative of whether another user, for example, is likely to have the security of her account compromised. Applicant further recognizes that traditional analysis techniques may not be sufficient to identify potential problems and risks to users, even when characteristic data for a number of users that interact with one another is present.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Knowing characteristics about users allows a service to realize security risks and to better market to the users. For example, a sudden change in a seller's industry may indicate that the seller has become a malicious user (or the seller's account has been taken over by a malicious user), the seller is switching industries and may have less experience in that industry, which may pose a credit risk to a lender, or the seller may be evading policy.

When trying to understand whether a seller (or other type of user) is risky, one way of determining risk is by looking at the industry the seller is in, e.g., fashion, food and drink, precious metals, etc. This is because differences in industry can affect the seller's risk profile in several ways: different business models, different buyer demographics, and differing fraud rates. Therefore, determining characteristics of users, such as the industry of a seller, may be helpful in assessing risk. Some solutions include querying a user about their industry, or looking at data such as the seller's website, descriptions of items sold by the seller, etc. However, these solutions may be limited because textual features are missing for some sellers (e.g., they do not have a website). Collected user data may be absent, unreliable, or stale and may not reflect up-to-date information. This is particularly true when the information is entered years prior when a user registered for a service and has not been updated since. Additionally, in ecommerce, a sudden change in a seller's industry is a bad indicator because it may indicate the seller account has become fraudulent (e.g., illustrating an increased fraud risk) or the seller started to sell items that they are less experienced with (e.g., illustrating an increased credit risk). The present disclosure solves the foregoing problem by modeling the seller industry by using information in the buying patterns of the seller's customers by applying natural language processing (NLP) algorithms such as word2vec.

Buying patterns of customers contain a lot of information regarding sellers. For example, if we want to identify what industry seller A is in and we have no additional information about seller A besides the transactions that buyers conduct with the seller, the industry of seller A can be predicted through customer or buyer data according to advanced and novel machine learning techniques discussed herein. Assume, for example, that out of one hundred buyers that bought from seller A, ninety are jewelry buyers (e.g., they tend to buy a lot of jewelry). Without knowing anything else about seller A, one can now predict, with a certain degree of certainty, that seller A sells jewelry, solely based on the activity of the buyers. The present disclosure uses NLP techniques to exploit this relationship to automatically determine the industry of the sellers, which enables users of the disclosed techniques to confirm user input of industry information and detection of fraudulent behavior, be able to customize the user interface toward specific industries.

Figure 1A:
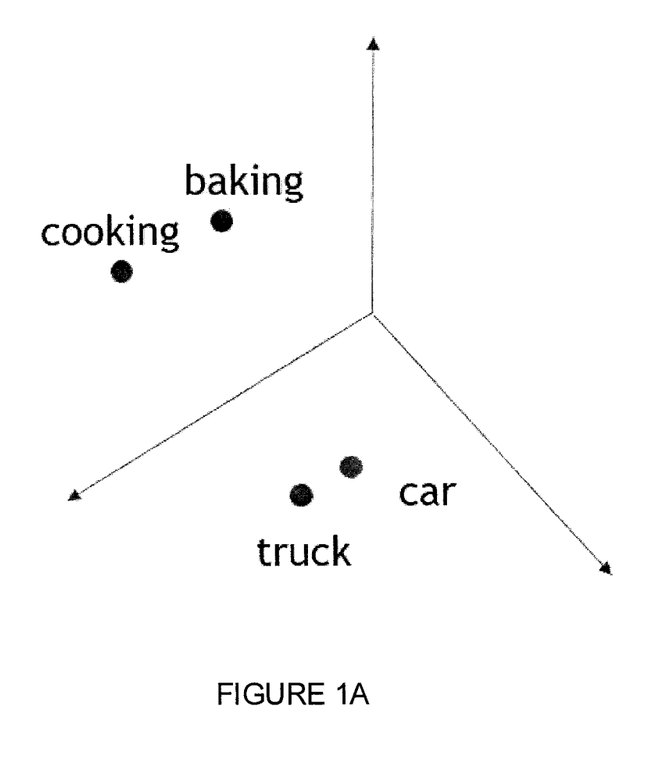
FIG. 1A illustrates an example vectorization according to the present techniques.

Word2vec is a group of related models that are used to produce word embeddings. The models may be shallow, two-layer neural networks that are commonly used to reconstruct linguistic contexts of words of a given language in a compact form. For a given vocabulary of words, word2vec creates "word embeddings"—mapping from each word to an n-dimensional vector. For example, "king" may be mapped to a five-dimensional vector with the value [0.8, 0.65, 1.7, 2, 4]. The word embeddings are created using the context in which the word appears, as the words that tend to appear next to it. Therefore, it is expected that words that appear in similar contexts will have similar vectors. For example, consider the sentences: "I really like cooking in the kitchen" and "I really like baking in the kitchen." FIG. 1A illustrates an example vectorization of the terms "baking" and "cooking" along with other words "car" and "truck." In this case, the words "baking" and "cooking" will have similar vectors because they tend to appear in similar context of surrounding words (the word "kitchen" for example has a common context of both words).

Word2vec may take as its input a large corpus of text and produces a vector space, typically of several hundred dimensions (e.g., 300 dimensions to represent the English vocabulary). Each unique word in the corpus is assigned a corresponding vector in the space. Word vectors are positioned in the vector space such that words that share common contexts in the corpus are located in close proximity to one another in the space. Other embedding and training algorithms such as FastText may be used similarly like word2vec as understood by one of ordinary skill in the art. In some embodiments, sentence and/or paragraph vectors may be calculated in addition to word vectors. Thus, a vector can be calculated for a user's buying history.

NLP techniques like word2vec may be adapted in a unique and unusual manner by applying word2vec to learn characteristics of a seller (e.g., the seller's industry) by examining buyer's activity over a time period rather than training the model on words and natural language. Embodiments of the present disclosure model each seller identifier as a word and each buying sequence as a sentence for natural language processing. For example, if a buyer bought something from seller_1, three days later bought from seller_2, and seven days after that bought from seller_3, the sequence derived from this buying activity may be: "seller_1 seller_2 seller_3." After the sequence is created for each buyer, word2vec may be applied to all sequences and map each seller into an m-dimensional vector. Similar sellers tend to have similar contexts which may indicate buyers who buy from them tend to have similar buying activity. K-nearest neighbors is a classification algorithm that finds a label for a given object by examining the labels of the k objects that are closest to it in space.

Figure 1B:
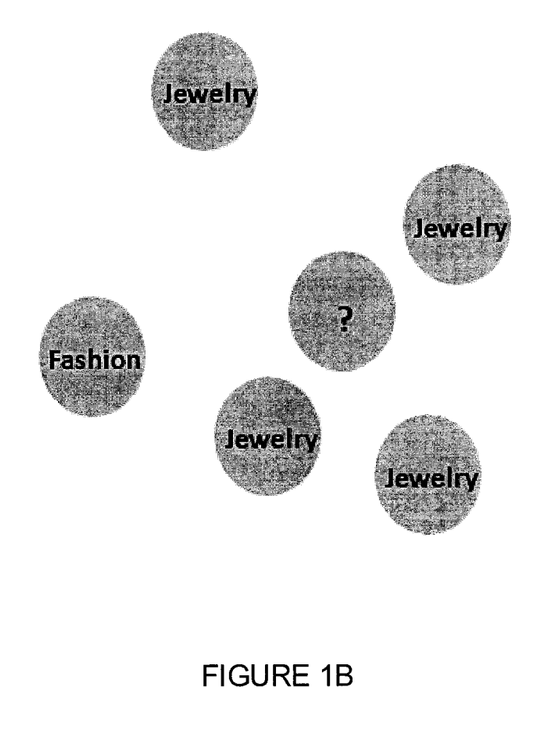
FIG. 1B is a simplified conceptual diagram of sellers with known and an unknown industry.

Periodically (e.g., weekly, monthly, etc.), word2vec may be run on data from the most recent period of time (e.g., week, two weeks, month, two months, six months, year, etc.). After word2vec maps every seller into a vector, the system can run the k-nearest neighbors algorithm on the sellers that are unknown based on a lack of textual data. For each seller (S) with insufficient textual data, the system can determine the k closest sellers in the vector space and give the seller S the label (industry) of the majority of its neighbors. FIG. 1B is a simplified conceptual diagram of sellers with known industries and an unknown industry. As illustrated, an unknown seller (illustrated with a question mark) that has four neighbors with "jewelry" industry and one with "fashion." Since the majority of the neighbors are "jewelry," the system may identify the unknown seller's industry as "jewelry."

Figure 2:
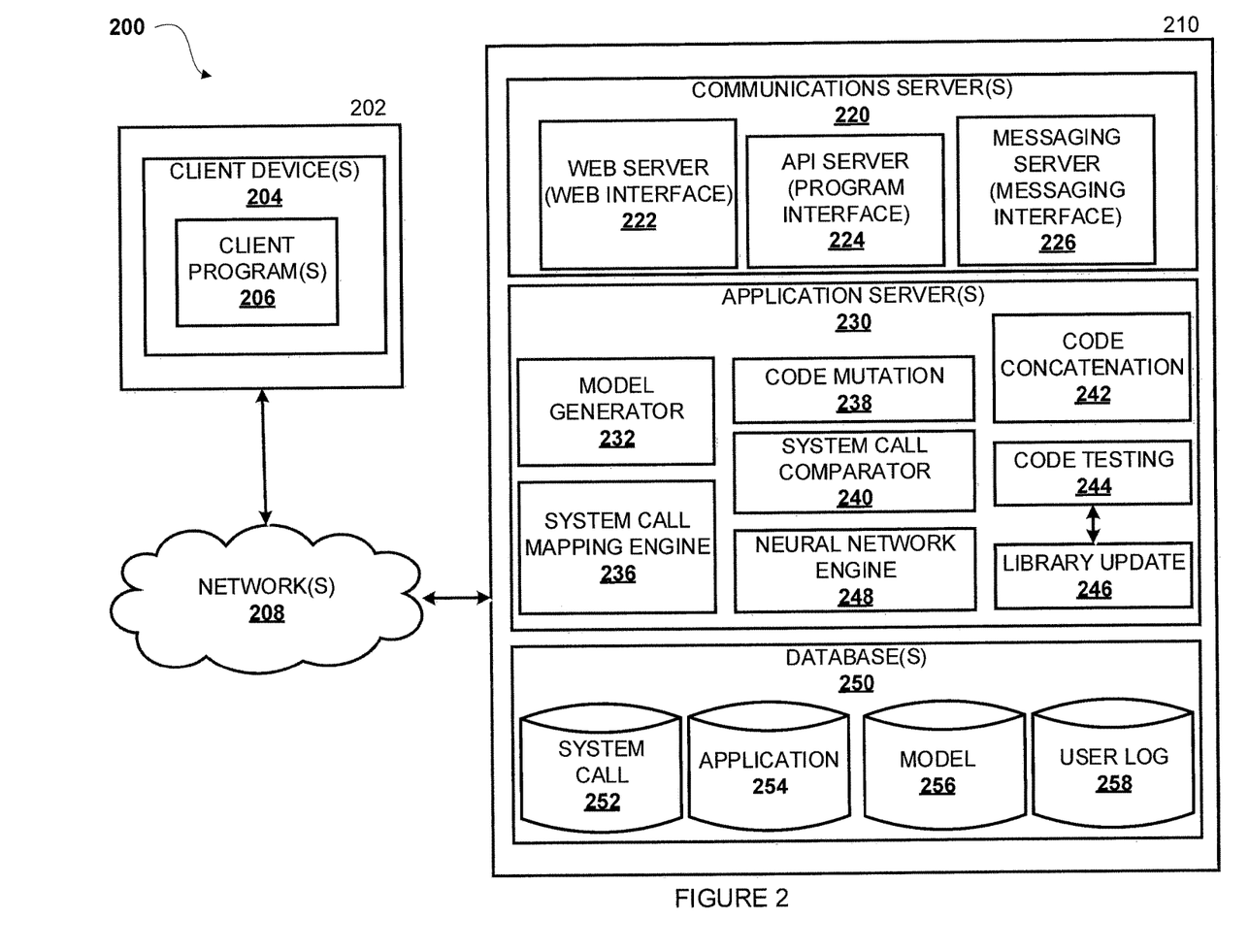
FIG. 2 is a block diagram of an example computing system for creating and analyzing of vector representations of user data.

FIG. 2 illustrates an example embodiment of a computing system 200 adapted for implementing one or more embodiments disclosed herein to perform natural language processing on user behavioral data. As shown, computing system 200 may comprise or implement a plurality of servers, devices, and/or software components that operate to perform various methodologies in accordance with the described embodiments. Example servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 2 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 200 may include, among various devices, servers, databases and other elements, one or more clients 202 comprising or employing one or more client devices 204, such as a laptop, a mobile computing device, a tablet, a personal computer, a wearable device, and/or any other computing device having computing and/or communications capabilities in accordance with the described embodiments. Client devices 204 may include a cellular telephone, smart phone, electronic wearable device (e.g., smart watch, virtual reality headset), or other similar mobile devices that a user may carry on or about his or her person and access readily.

Client devices 204 generally may provide one or more client programs 206, such as system programs and application programs to perform various computing and/or communications operations. Example system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 204. In some embodiments, client programs 206 may include one or more applications configured to conduct some or all the functionalities and/or processes discussed herein.

As shown, client devices 204 may be communicatively coupled via one or more networks 208 to a system 210. System 210 may be configured to perform natural language processing as well as payment services. System 210 may be structured, arranged, and/or configured to allow client 202 to establish one or more communications sessions between system 210 and various client devices 204 and/or client programs 206. Accordingly, a communications session between client devices 204 and system 210 may involve the unidirectional and/or bidirectional exchange of information and may occur over one or more types of networks 208 depending on the mode of communication. While the embodiment of FIG. 2 illustrates a computing system 200 deployed in a client-server operating environment, it is to be understood that other suitable operating environments and/or architectures may be used in accordance with the described embodiments.

Data communications between client devices 204 and system 210 may be sent and received over one or more networks 208 such as the Internet, a WAN, a WWAN, a WLAN, a mobile telephone network, a landline telephone network, personal area network, as well as other suitable networks. For example, client devices 204 may communicate with system 210 over the Internet or other suitable WAN by sending and or receiving information via interaction with a website, an application, e-mail, IM session, and/or video messaging session. Any of a wide variety of suitable communication types between client devices 204 and system 210 may take place, as will be readily appreciated. In particular, wireless communications of any suitable form (e.g., Bluetooth, near-field communication, etc.) may take place between client device 204 and system 210, such as that which often occurs in the case of mobile phones or other personal and/or mobile devices.

System 210 may comprise one or more communications servers 220 to provide suitable interfaces that enable communication using various modes of communication and/or via one or more networks 208. Communications servers 220 may include a web server 222, an application programming interface (API) server 224, and/or a messaging server 226 to provide interfaces to one or more application servers 230. Application servers 230 of system 210 may be structured, arranged, and/or configured to provide various online services to client devices that communicate with system 210. In various embodiments, client devices 204 may communicate with application servers 230 of system 210 via one or more of a web interface provided by web server 222, a programmatic interface provided by API server 224, and/or a messaging interface provided by messaging server 226. It may be appreciated that web server 222, API server 224, and messaging server 226 may be structured, arranged, and/or configured to communicate with various types of client devices 204, and/or client programs 206 and may interoperate with each other in some implementations.

Web server 222 may be arranged to communicate with web clients and/or applications such as a web browser, web browser toolbar, desktop widget, mobile widget, web-based application, web-based interpreter, virtual machine, mobile applications, and so forth. API server 224 may be arranged to communicate with various client programs 106 comprising an implementation of API for network-based system 210, such as a Simple Object Access Protocol (SOAP) or Representational State Transfer (REST) API. Messaging server 226 may be arranged to communicate with various messaging clients and/or applications such as e-mail, IM, SMS, MMS, telephone, VoIP, video messaging, IRC, and so forth, and messaging server 226 may provide a messaging interface to enable access by client 202 to the various services and functions provided by application servers 230.

Application servers 230 of system 210 may be servers that provide various services to client devices, such as tools for authenticating users and associated libraries. Application servers 230 may include multiple servers and/or components. For example, application servers 230 may include a model generator 232, systemcall mapping engine 236, a code mutation engine 238, a system call comparison engine 240, a code concatenation engine 242, a testing engine 244, a library update engine 246, and/or a neural network engine 248. These servers and/or components, which may be in addition to other servers, may be structured and arranged to identify fraudulent users/user accounts.

Application servers 230, in turn, may be coupled to and capable of accessing one or more databases 250 including a system call database 252, an application database 254, a model database 256, and an activity log database 258 which may also include logs of user activity including purchases made by multiple user accounts. Databases 250 generally may store and maintain various types of information for use by application servers 230 and may comprise or be implemented by various types of computer storage devices (e.g., servers, memory) and/or database structures (e.g., relational, object-oriented, hierarchical, dimensional, network) in accordance with the described embodiments.

Figure 3:
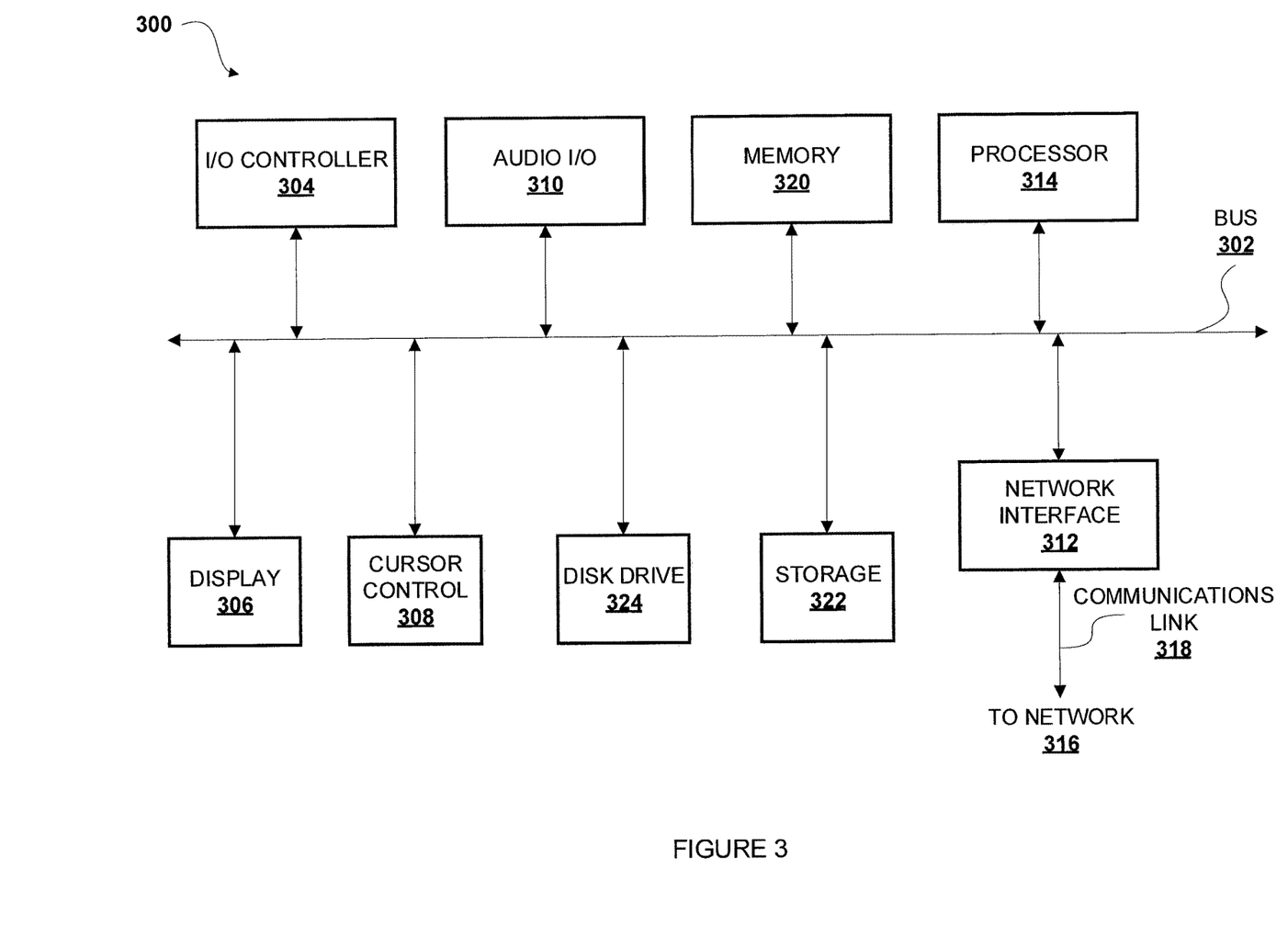
FIG. 3 is a block diagram of an example computer system suitable for implementing one or more devices of the computing system in FIG. 2.

FIG. 3 illustrates an example computer system 300 in block diagram format suitable for implementing on one or more devices of the computing system in FIG. 2. In various implementations, a device that includes computer system 300 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 300 in a manner as follows. Additionally, as more and more devices become communication capable, such as smart devices using wireless communication to report, track, message, relay information and so forth, these devices may be part of computer system 300.

Computer system 300 may include a bus 302 or other communication mechanisms for communicating information data, signals, and information between various components of computer system 300. Components include an input/output (I/O) controller 304 that processes a user action, such as selecting keys from a keypad/keyboard, selecting one or more buttons, links, actuatable elements, etc., and sends a corresponding signal to bus 302. I/O controller 304 may also include an output component, such as a display 306 and a cursor control 308 (such as a keyboard, keypad, mouse, touchscreen, etc.). In some examples, I/O controller 304 may include an image sensor for capturing images and/or video, such as a complementary metal-oxide semiconductor (CMOS) image sensor, and/or the like. An audio I/O component 310 may also be included to allow a user to use voice for inputting information by converting audio signals. Audio I/O component 310 may allow the user to hear audio.

A transceiver or network interface 312 transmits and receives signals between computer system 300 and other devices, such as another user device, a merchant server, an email server, application service provider, web server, a payment provider server, server clusters, and/or other servers via a network. In various embodiments, such as for many cellular telephone and other mobile device embodiments, this transmission may be wireless, although other transmission mediums and methods may also be suitable. A processor 314, which may be a micro-controller, digital signal processor (DSP), or other processing component, processes these various signals, such as for display on computer system 300 or transmission to other devices over a network 316 via a communication link 318. Again, communication link 318 may be a wireless communication in some embodiments. Processor 314 may also control transmission of information, such as cookies, IP addresses, images, and/or the like to other devices.

Components of computer system 300 also include a system memory 320 (e.g., RAM), a static storage component 322 (e.g., ROM), and/or a disk drive 324. Computer system 300 performs specific operations by processor 314 and other components by executing one or more sequences of instructions contained in system memory 320. Logic may be encoded in a computer-readable medium, which may refer to any medium that participates in providing instructions to processor 314 for execution. Such a medium may take many forms, including but not limited to, non-volatile media, volatile media, and/or transmission media. In various implementations, non-volatile media includes optical or magnetic disks, volatile media includes dynamic memory such as system memory 320, and transmission media includes coaxial cables, copper wire, and fiber optics, including wires that comprise bus 302. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 202, system 210, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and, in more detail, below.

Machine learning algorithms typically require the data used to be represented numerically. Databases or user usage logs may contain a listing of user transactions and contain information about the seller. Thus, an algorithm may attempt to leverage the user data (including transaction data) to produce an accurate and compact representation of the data. Data may thus be converted into a suitable format prior to employing machine learning techniques discussed herein. Applying the word2vec algorithm, which can be used for natural language processing (NLP), to a user's usage history with a service can provide a manner in which the actions of the user may be efficiently organized in a compact representation, and subsequently leveraged to produce useful predictions and reports.

Figure 4:
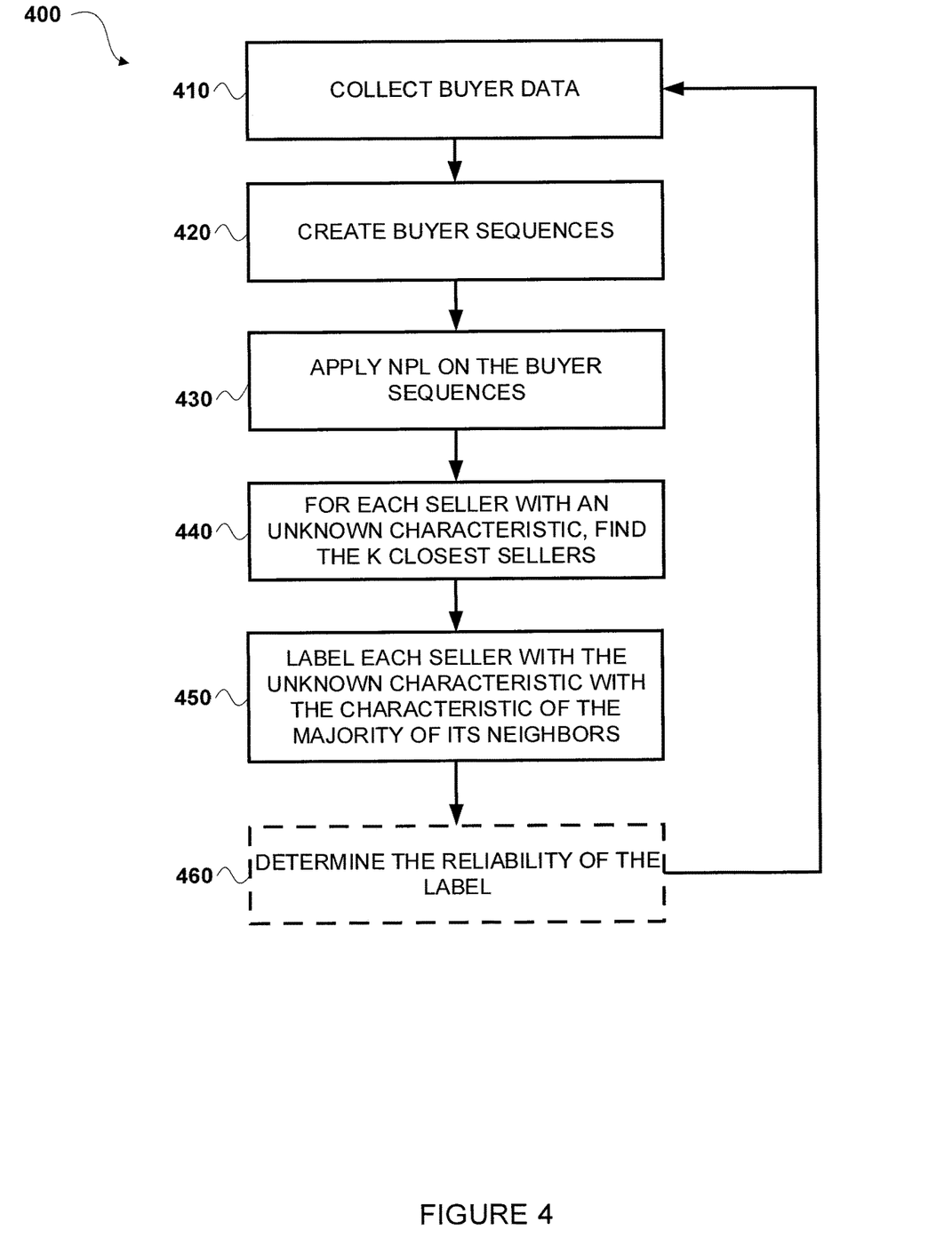
FIG. 4 is a flow diagram illustrating an example process for creating and analyzing of vector representations of user data.

FIG. 4 is a flow diagram illustrating an example process 400 for determining user criteria using natural language processing. One or more aspects of process 400 may be performed by system 210, system 300, or any other suitable computer system, in various embodiments. For ease of explanation, however, various operations below will be discussed relative to particular systems (e.g. system 210). System 210 may identify a seller's industry using buyer's shopping behavior, with particular machine learning techniques. In step 410, the system 210 collects buyer data over a particular period of time, according to some embodiments. Buyer data may be collected from activity logs, dedicated transaction logs, or may be collected from any other data structure or document as transactions are made between buyers and sellers. The transaction log data may be associated with a plurality of users. The transaction log data may indicate a series of one or more purchases made by users and sellers. In some embodiments, the time period is two weeks, however one week, one month, six months, and a year or any other time frame may also be used to determine the current industry of a seller, where the time period may depend on various factors, including trends in an industry. In one example, the time period the system 210 uses to collect buyer data at may be based on the number of entries in the database and/or number of entries that include the seller. For example, when the number of entries is below a threshold, the system 210 may select a longer time period. Transaction log data may include a variety of information about a transaction, including but not limited to one or more a buyer identity, a seller identity, a purchase amount, a type of good or service purchased, a date and/or time of purchase, and an identified industry of the seller.

Figure 5:
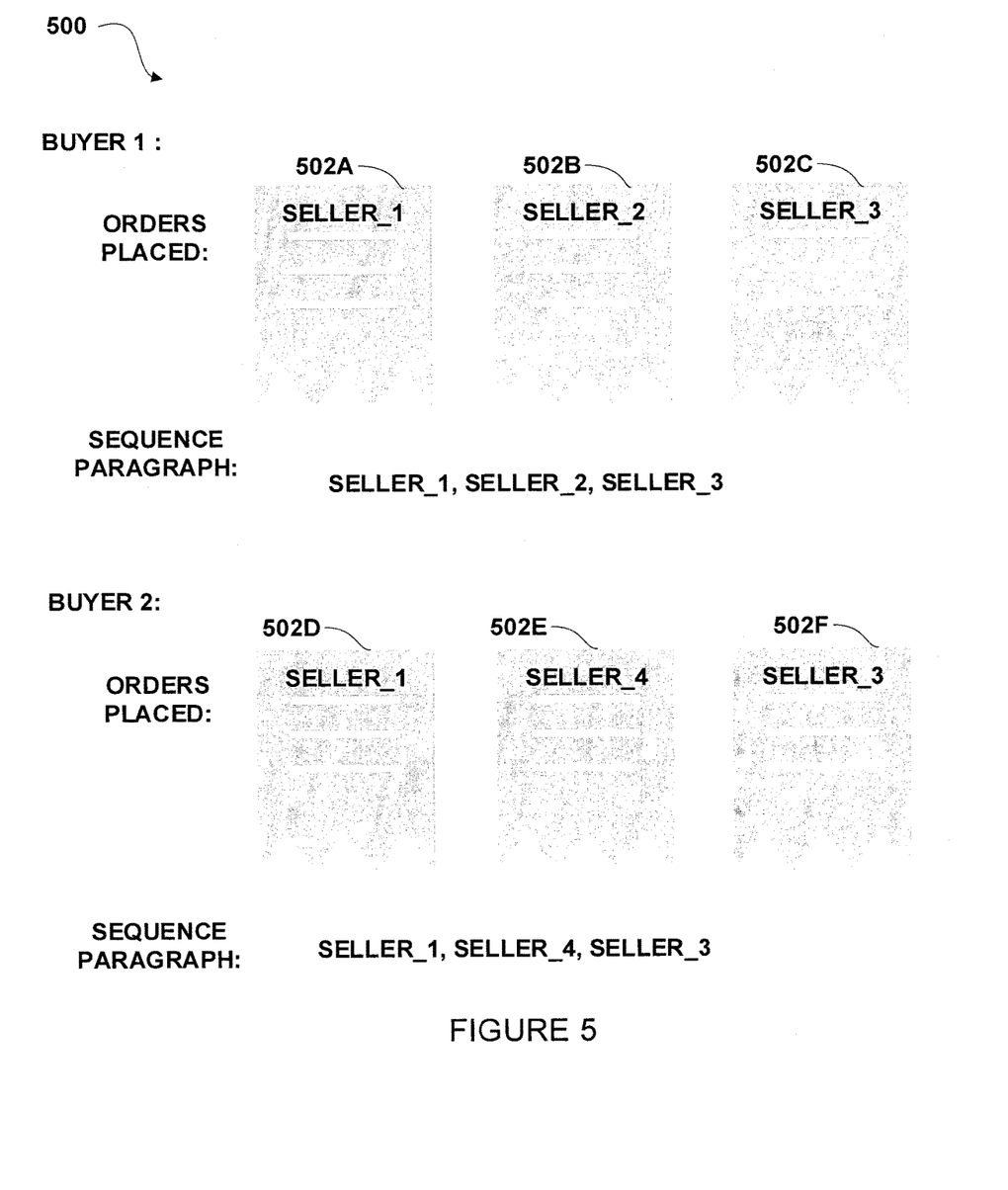
FIG. 5 illustrates an example use case of the one or more devices of the computing system for creating and analyzing of vector representations of user data.

In step 420, the system 210 creates buyer sequences based on the collected buyer data. Each of the buyer sequences may be associated with a different buyer using the system 210 (or using the system 210 over the particular time period). The collected buyer data may be parsed by the system 210 to retrieve sequential seller information. The system 210 may compile seller names (or identifiers) for use in the word2vec algorithm. The sequences may include one or more sentences/paragraphs in a text file or an array of strings. Each sequence includes a listing of each seller a buyer purchased from listed in chronological (or reverse chronological) order, according to various embodiments. In some examples, the seller name is listed in other examples as a symbolic or numeric representation of the seller name for use in NLP. FIG. 5 will now be discussed before returning to FIG. 4.

FIG. 5 is an example illustration 500 of two buyer's order history for a particular time period and a representative sequence paragraph for each buyer. The system 210 may parse a log of orders placed (represented by receipts 502A-F) and sort the receipts by buyer and date and extract seller identifiers from each of the orders placed. For each buyer (buyer 1 and buyer 2), the system 210 may generate a chronological sequence paragraph (e.g., a string within an array) for parsing using NLP to vectorize each of the seller's names. The system 210 feeds the collection of sequence paragraphs into a natural language processing (e.g., word2vec) module of neural network engine 248, according to various embodiments.

As discussed above, word2vec is a shallow word embedding model that, in this instance, learns to map sellers into a low-dimensional continuous vector-space based on distributional properties observed from the corpus (e.g., historical data of network traffic). A shallow word embedding model, in contrast to a deep learning model, refers to a machine learning algorithm without multiple middle/hidden-layers. The low-dimensional continuous vector-space refers to an encoding with one or more orders of magnitude less than a dimensional space of source materials. For example, English has hundreds of thousands of words but a vector space representing the language may be 300 or fewer dimensions. When applied to a language, word2vec produces low-dimensional representations that capture relationships between words of a corpus to highlight linguistic regularities. That is, the statistics of how often some word co-occurs with neighboring words in a large text corpus are computed and then mapped to a vector for each word. Once a low-dimensional embedding has been produced, predictive models can then be formulated based on the embedding. The predictive models may, for example, predict a word from its neighbors. Word2vec typically utilizes two model architectures—the continuous bag of words (CBOW) and the skip-gram models. While the two models are algorithmically similar, CBOW is used to predict target words from source context words while the skip-gram does the inverse and predicts source context-words from the target words.

Referring back to FIG. 4, in step 430, the system 210 applies NLP (e.g., word2vec, autoencoder) on the buyer sequence paragraphs and maps each seller to a vector in a vector space, according to various embodiments. System 210 may assign each seller username encountered in a buyer's sequence paragraphs a vector.

According to some embodiments, system 210 may preprocess all buyer sequence paragraphs to determine the size of the vocabulary of seller's usernames. Two matrices may be created, an embedding matrix and a context matrix that represents a hidden layer in a neural network. Each matrix may include a dimension for each seller in the vocabulary and a dimension for the embedding size—the number of dimensions in the vector space. At the start of training, each matrix may be initialized with random values or the vector may be one-hot coded such that each word in the vocabulary has an input vector with all zeros and a single value of one corresponding to the word in the vocabulary. A training task is provided such as provided in the CBOW and skip-gram models discussed above, for example, to find the probabilities of each seller's username within a preselected window near an input word or to predict target words given a context seller username. The training data used to train the model are all the buyer's sequence paragraphs and individual seller's usernames may. As a result of the training, the word embedding matrix may end up representing the seller's usernames which are contextually near it in all the buyer's sequence paragraphs providing a vector for each seller.

The system 210 may determine for each seller with an unknown characteristic (e.g., an industry classification) the k-sellers closest to that seller in the vector space, in step 440. The value for k may be a preselected number (e.g. 1, 5, 10, 100, 150, 1000) or it may be selected based on the number of total sellers. According to some embodiments, sellers within a threshold distance of the seller with the unknown characteristic may be selected as the k-value. In some embodiments, the system 210 may calculate and record the distance between the seller with the unknown characteristic and each vector in the vector space. The distance may be a Euclidean distance, Manhattan distance, or a cosine distance between the vectors. The recorded distances may be sorted from smallest to largest in ascending order by distances and the first (i.e. closest) k-entries are selected from the sorted collection. Alternatively, rather than preselecting a number of neighbors, "k," a distance may be preselected and all the neighboring vectors within the preselected distance are used to determine the characteristic of the seller.

In step 450, the system 210 may mark the seller with the unknown characteristic as having the characteristic (e.g., seller industry) as the majority (or plurality) of its neighbors. The characteristic of the neighbors may be tallied and the characteristic with the greatest number determined based on the tally. Labels for each of the k entries are retrieved and the mode (most common) of the k labels is assigned to the seller with the unknown characteristic, according to various embodiments. Alternatively, characteristics of the neighbors may be weighted based on distance to the seller and a weighted mode may be assigned to the seller with the unknown characteristic.

Certain determined labels for the characteristic may be of a higher quality or more reliable than other labels. For example, in testing, the labeling of industry data of sellers based on buyer's data precision and recall values were determined for different industry types. This is used to determine whether certain industries are characterized by unique buying patterns while others are not. Table 1 shows the results of the testing.

TABLE 1

| Category | Precision | Recall |
| --- | --- | --- |
| Auto-Parts | 0.58 | 0.76 |
| Fashion | 0.43 | 0.69 |
| Food and Drink | 0.15 | 0.17 |
| Coins | 0.68 | 0.65 |

Figure 6:
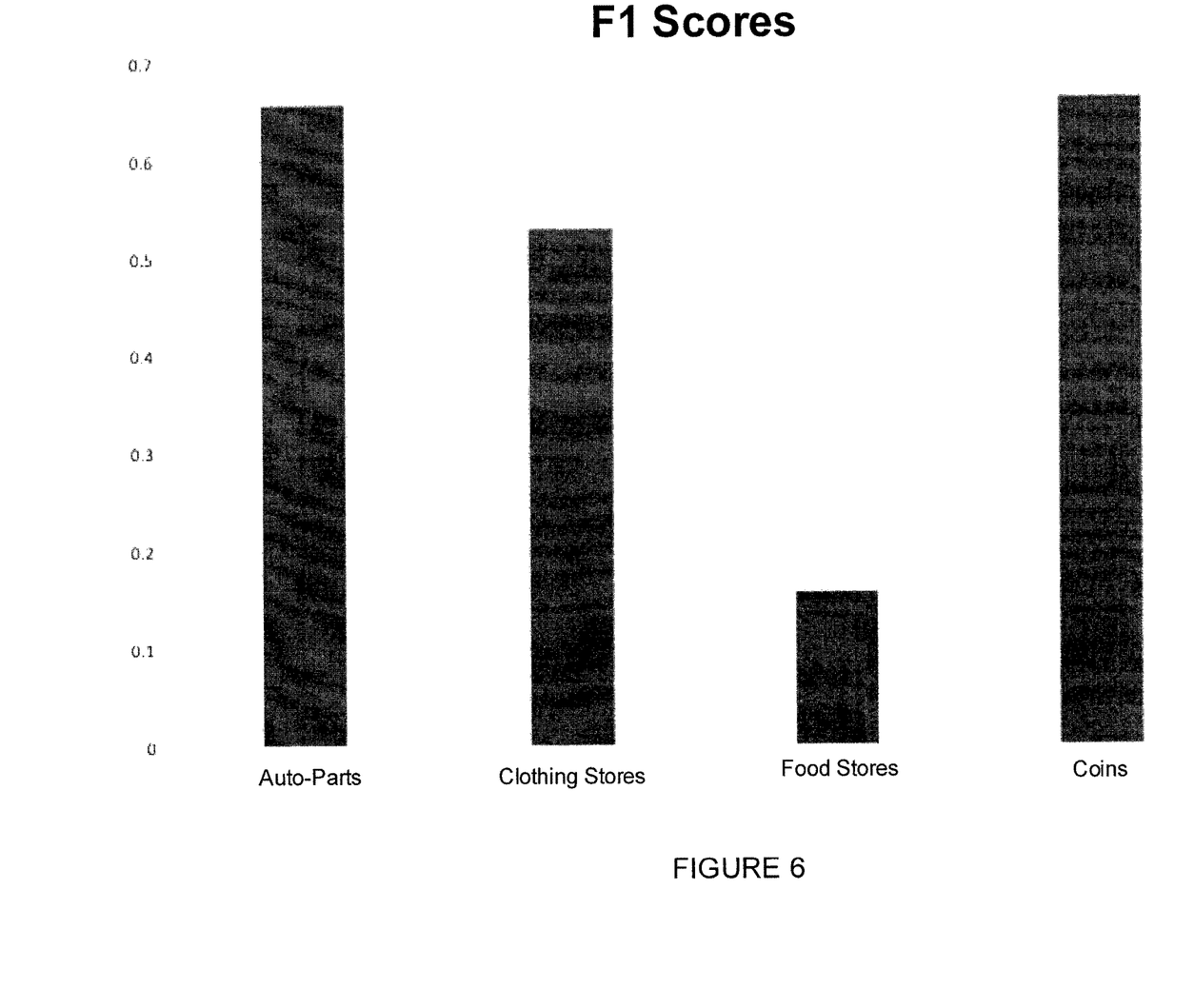
FIG. 6 illustrates a chart with calculated F1 scores for certain industries.

FIG. 6 illustrates a chart with calculated F1 scores based on the data in Table 1 for certain industries. The F1 score uses both the precision p and the recall r where: p is the number of correct positive results divided by the number of all positive results returned by the classifier, and r is the number of correct positive results divided by the number of all relevant samples (all samples that should have been identified as positive). The F1 score is the harmonic mean of the precision and recall, where an F1 score reaches its best value at 1 (perfect precision and recall) and worst at 0.

For some industries, such as Auto Parts and Coins in this example, prediction scores are generated that are a lot higher than random, which indicates there is a lot of information regarding the seller's industry in the buyer's activity. Additionally, industries with similar coverage in the population, such as Food and Drink and Coins, yield different results.

For example, the following are typical sequence paragraphs for typical buyers with purchases in different industries:

Coins buyer A: "coins|coins|coins|coins|coins|coins"
Coins buyer B: "coins|coins|coins|services-other|coins|services-other"

Food & Drinks buyer A: "fashion|fashion|music-videos music-videos|music-videos media|food-n-drink food-n-drink food-n-drink"

Food & Drinks buyer B: "photography|tickets|food-n-drink-|website-services|food-n-drink|books"

In the above example, coin buyers A and B buy mostly or exclusively purchase coins using their account. Buyer's within the category of food and drink may not be as exclusive to the industry category. As a result, for some characteristics, some are related to unique buying patterns of buyers and others are not. As a result, some characteristics (e.g., specific industry categories) may be easier or more reliable to predict (coin sellers) than others (food and drink sellers) from the buyer data alone. Even where the buyer's purchasing habits are not exclusive or near exclusive, the present techniques may be used in combination with other data (e.g. seller website data, other account data, seller purchasing data) about a seller to predict seller characteristics.

Figure 7:
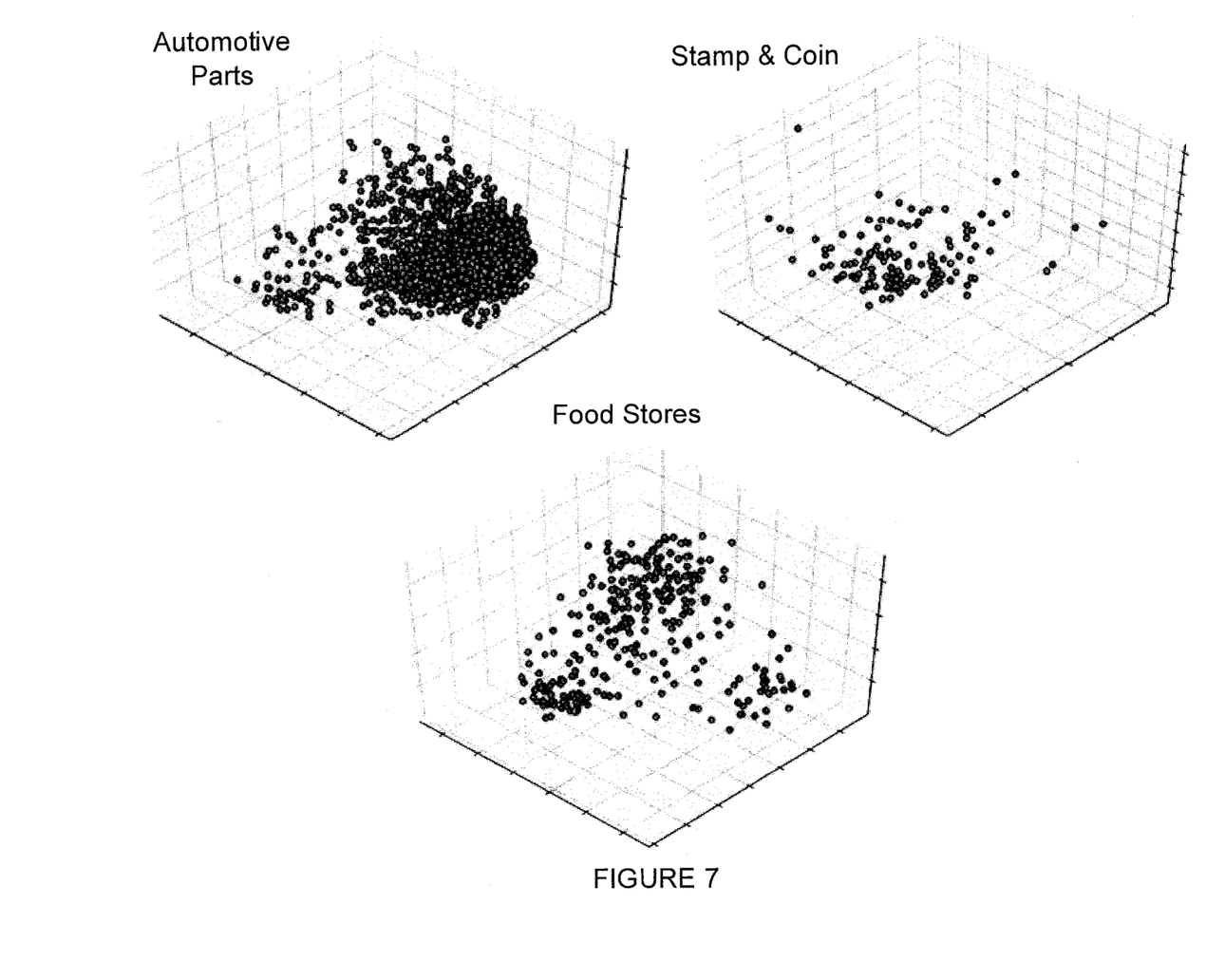
FIG. 7 are visualizations of the multidimensional vector space into three dimensions.

FIG. 7 are exemplary visualizations of the multidimensional vector space into three dimensions using Principal Component Analysis (PCA) for different industry classifications. As shown, the sellers identified in the industries of "automotive parts" and "stamp and coin" have more distinct clustering than the industry of "food stores."

Figure 8:
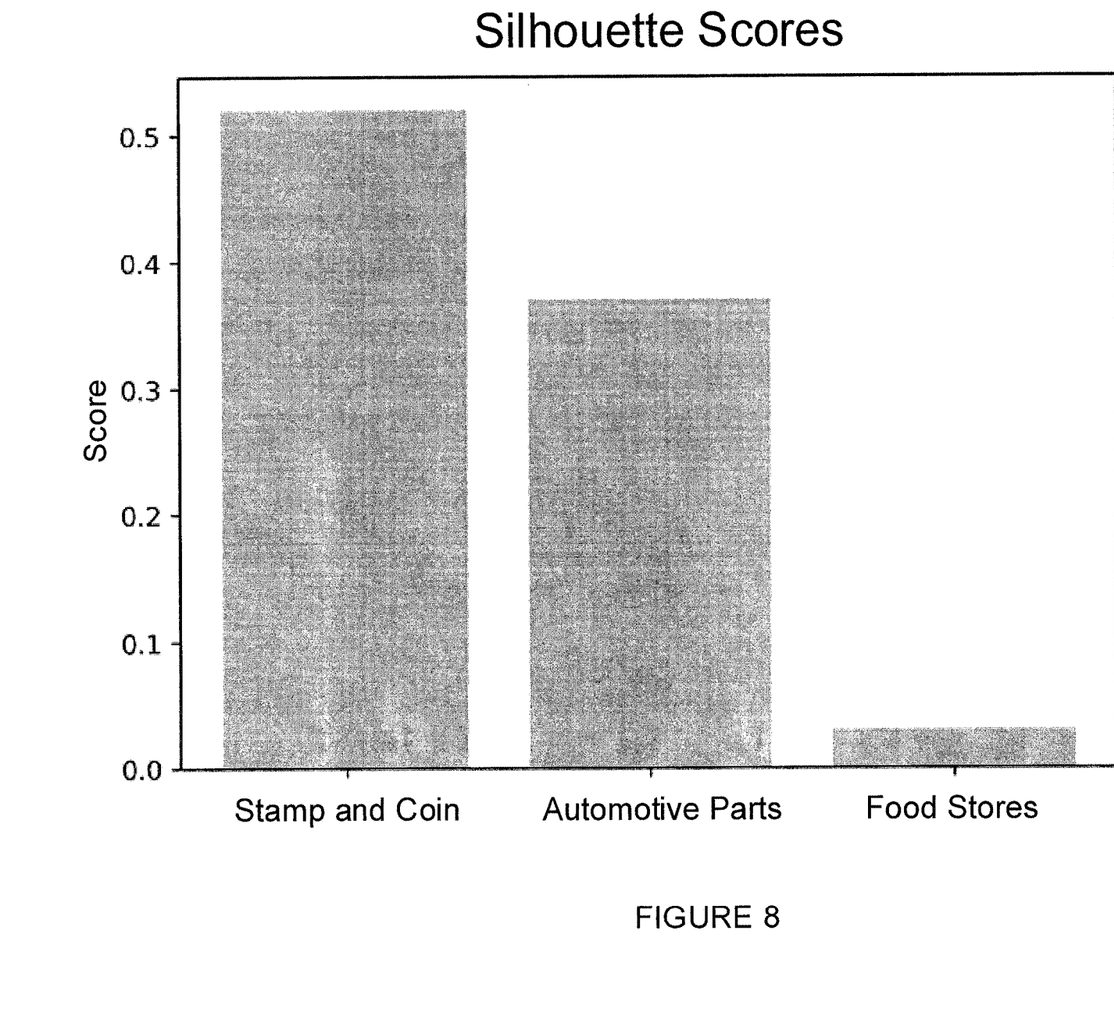
FIG. 8 illustrates a chart with calculated average silhouette scores for certain industries.

Quality of clusters of sellers may be measured using a silhouette score. The silhouette score is a measure of how similar an object is to its own cluster (cohesion) compared to other clusters (separation). The silhouette score ranges from −1 to +1, where a high value indicates that the object is well matched to its own cluster and poorly matched to neighboring clusters. If most objects have a high value, then the clustering configuration is appropriate. If many points have a low or negative value, then the clustering configuration may have too many or too few clusters. The silhouette score can be calculated with any distance metric, such as the Euclidean distance or the Manhattan distance. For each vector in the cluster, $$S(i) = \frac{b(i) - a(i)}{\max(b(i), a(i))}$$

where S(i) is the silhouette score, b(i) is the smallest distance of i to all points in any other cluster that it is not a member, and a(i) is the smallest distance of i to all points in the identified cluster. FIG. 8 illustrates a chart with calculated average silhouette scores for certain industries.

Figure 9:
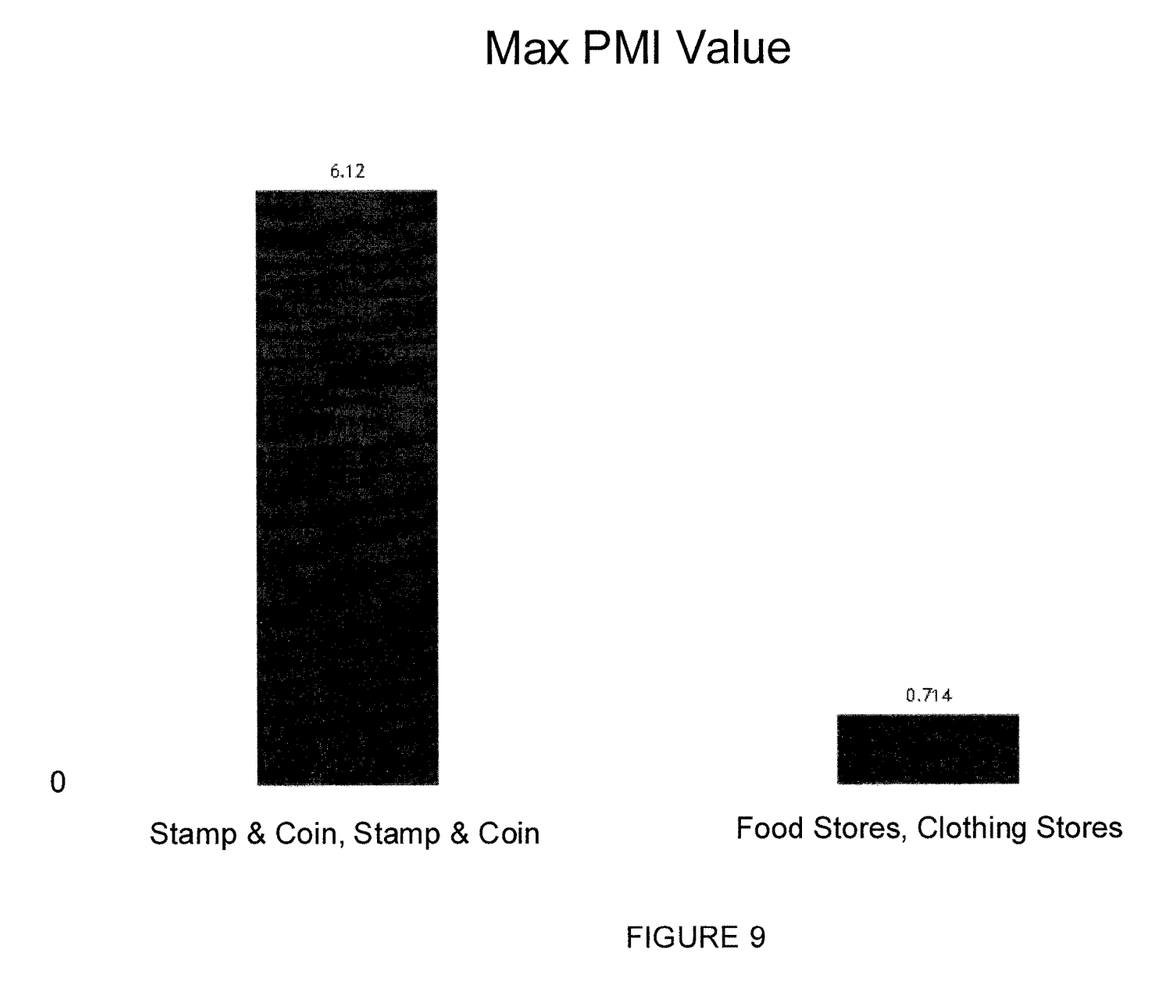
FIG. 9 illustrates a chart with calculated maximum PMI scores for certain industries.

Pointwise mutual information (PMI) is another way to compare (or correlate) clusters/industries.

$$PMI(a, b) = \log\left(\frac{P(a, b)}{P(a) \cdot P(b)}\right)$$

$$\text{Max } PMI(i) = \max_{j \in A}(PMI(i, j))$$

The PMI of a pair of outcomes a and b belongs to discrete random variables A and B and quantifies the discrepancy between the probability of their coincidence given their joint distribution and their individual distributions, assuming independence. Function P( ) is the probability function. Max PMI is calculated as the maximum PMI. the PMI score can be checked between industries and among the same industry. For example, the "stamp and coin" industry may be compared with every other industry. "Stamp and coin" and "fashion" will have a certain PMI score indicating the tendency of those industries to appear together in a buyer's buying sequences. Similarly, "stamp and coin" and "automotive parts" will get a certain PMI score indicating the tendency of those industries to appear together in buyer's buying sequences. The maximum PMI may be the industry that a certain industry has the highest tendency to appear with. In some examples, the other industry may be itself. Alternatively, max PMI may only include other industries. FIG. 9 illustrates a chart with exemplary calculated maximum PMI scores for certain industry combinations. For example, the maximum correlation with the "stamp & coin" industry may be itself, indicating that other stamp and coin sellers are most likely to appear in a buyer's sequence. For "food stores," the maximum correlation may be with "clothing stores."

Referring back to FIG. 4, one or more of the F1 scores, silhouette scores, and PMI scores may be used to determine a quality measure of a classification or whether the determined characteristic is reliable to label a characteristic of the seller, at step 460. For example, if the system determined that the industry of a seller is "automotive parts" or "stamp and coin," as those industries have reliable F1 scores, silhouette scores, and/or PMI scores as discussed above, the system 210 may assign the determined industry label to the seller. However, if the determined industry was determined to be "food," the system 210 may not assign the industry label to the seller without additional confirmation (textual data such as the seller's website or catalog, user confirmation) because there is less reliability in the assigning entity.

The industry label can be used by the system 210 to determine whether the account meets the terms of service and/or applicable laws. The industry label can also be used to determine whether to extend credit to the seller account. Further, a website or application may offer different user interfaces based on different user characteristics, e.g., industry or industry specific offers.

In some embodiments, user characteristics (such as seller industry) may be periodically re-determined based on updated transaction data from buyers. For example, each week, sellers with an unknown industry that may be determined using buyer data generated the previous two weeks.

Figure 10:
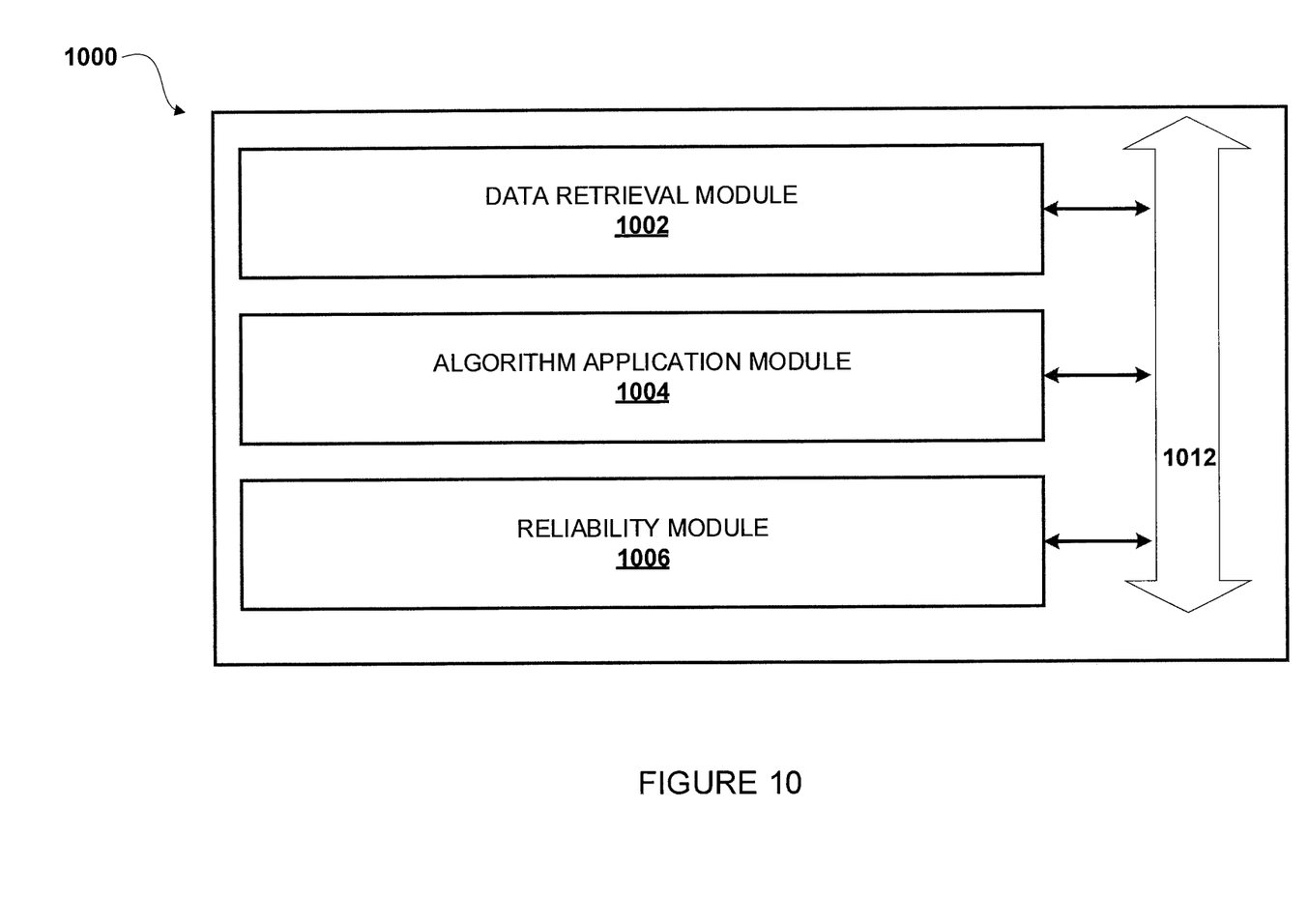
FIG. 10 illustrates a block diagram of components of an example system for creating and analyzing of vector representations of user data.

FIG. 10 provides an illustration of components of a system 1000 for identifying changes in user characteristics using NLP, in accordance with various aspects of the subject technology. System 1000 comprises a data retrieval module 1002, an algorithm application module 1004, and a reliability module 1006. These modules may be in communication with one another via a bus 1012. In some aspects, the modules may be implemented in software (e.g., subroutines and code). The software implementation of the modules may operate on client device 204 or system 210 as an application that is running a specific language compatible to the modules. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Data retrieval module 1002 is used to retrieve transaction data. As discussed above, data representing all transactions on a particular website may be obtained. This data includes information such as browsing history and interactions performed for each of the many users that have browsed the website, application, or service. Included in this retrieved data is all the purchases made by a buyer, and the sequence/order in which the purchases were made by the users.

System 1000 further comprises algorithm application module 1004 configured to apply one or more natural language processing algorithms (e.g. word2vec) to a corpus, which in this case is the retrieved transactions data. By applying word2vec, a prediction model may be generated. The prediction model maps each seller to a vector in a vector space. Algorithm application module 1004 may also apply the k-nearest neighbors to sellers with an unknown characteristic. Algorithm application module 1004 may mark a seller with an unknown characteristic, such as the seller's industry, based on applying the k-nearest neighbor algorithm described above. Reliability module 1006 may determine the reliability of a determination of the algorithm application module 1004.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "example" is used herein to mean "serving as an example, instance, or illustration." Any implementation described herein as "example" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
a non-transitory memory storing instructions; and
one or more hardware processors coupled to the non-transitory memory and configured to read the instructions from the non-transitory memory to cause the system to perform operations comprising:
  receiving transaction log data associated with a plurality of users, the transaction log data comprising a plurality of sellers with whom the plurality of users have transacted;
  accessing a plurality of buyer sequences based on the transaction log data, each of the buyer sequences indicating a series of one or more purchases made by a respective user of the plurality of users with one or more of the plurality of sellers;
  mapping, based on a natural language processing algorithm performed with the plurality of buyer sequences, each of the plurality of sellers to a respective vector in a vector space;
  determining classifications of the plurality of sellers based on vectors mapped to the sellers;
  determining that a buyer sequence for a first seller of the plurality of sellers lacks sufficient textual data to determine a classification of the first seller;
  locating one or more other sellers in the vector space within a threshold distance to the first seller; and
  determining the classification of the first seller based on classifications of the one or more other sellers within the threshold distance of the first seller.

2. The system of claim 1, wherein the natural language processing algorithm is a word2vec algorithm.

3. The system of claim 1, wherein prior to determining the classification of the first seller, the system has no data or data older than a threshold time period on an industry of the first seller, and the one or more other sellers each have data on industries associated with the one or more other sellers.

4. The system of claim 1, wherein the plurality of buyer sequences comprises a data structure comprising a chronological listing of identifiers of sellers associated with each seller of the plurality of sellers in the plurality of buyer sequences.

5. The system of claim 1, wherein the operations further comprise:
determining a quality measure of the one or more other sellers in the vector space to determine a reliability of the classification of the first seller, wherein determining the classification of the first seller is further based on the quality measure.

6. The system of claim 5, wherein determining the quality measure of the one or more other sellers comprises comparing an average distance in the vector space between the first seller and the one or more other sellers and a plurality of remaining sellers from the plurality of sellers.

7. The system of claim 5, wherein determining the quality measure is based on a calculation of a silhouette score.

8. The system of claim 5, wherein determining the classification of the first seller is based on a calculation of a pointwise mutual information (PMI) or a maximum PMI score.

9. A method comprising:
receiving, by one or more hardware processors, transaction log data associated with a plurality of users, the transaction log data comprising a plurality of sellers with whom the plurality of users have transacted;
creating a plurality of buyer sequences based on the transaction log data for each of the plurality of users, each of the buyer sequences indicating a series of one or more purchases made by a respective user of the plurality of users at one or more of the plurality of sellers;
mapping each of the plurality of sellers to a vector in a vector space using a natural language processing algorithm applied to the plurality of buyer sequences;
determining classifications of the plurality of sellers based on vectors mapped to the plurality of sellers;
determining that the buyer sequence for a first seller of the plurality of sellers lacks sufficient textual data to determine a classification of the first seller;
locating one or more other sellers in the vector space within a threshold distance to the seller; and
determining a classification of the first seller based on classifications of the one or more other sellers in the vector space within the threshold distance to the first seller.

10. The method of claim 9, wherein:
the classification is an industry of the first seller, and
determining the classification of the first seller is based on known industries of the one or more other sellers within the threshold distance of the first seller.

11. The method of claim 9, wherein determining the classification of the first seller uses a k-nearest neighbors algorithm.

12. The method of claim 11, wherein the k-nearest neighbors algorithm comprises a weighted k-nearest neighbors algorithm, wherein classifications of the one or more other sellers are weighted based on respective distances to the first seller.

13. The method of claim 9, wherein the transaction log data associated with the plurality of users contains data for a particular time period.

14. The method of claim 9, wherein determining the classification of the first seller is further based on known industries of the plurality of sellers within the threshold distance to the first seller.

15. A non-transitory machine-readable medium having stored thereon machine-readable instructions executable to cause a machine to perform operations comprising:
receiving transaction log data associated with a plurality of users, the transaction log data comprising a plurality of sellers with whom the plurality of users have transacted;
accessing a plurality of buyer sequences based on the transaction log data, each of the buyer sequences indicating a series of one or more purchases made by a respective user of the plurality of users at one or more of the plurality of sellers;
mapping, based on a natural language processing algorithm performed with the plurality of buyer sequences, each of the plurality of sellers to a respective vector in a vector space;
determining for each of the plurality of sellers whether classification data is missing;
determining, for a first seller that classification data is determined to be missing, other sellers in the vector space within a threshold distance; and
determining, for the first seller of the plurality of sellers that classification data is determined to be missing, a classification based on classifications of ones of the plurality of sellers where classification data is not missing within the threshold distance of the first seller.

16. The non-transitory machine-readable medium of claim 15, wherein the operations further comprise: altering a user interface to display an offer based on the classification.

17. The non-transitory machine-readable medium of claim 15, wherein the operations further comprise: determining an incorrectly classified seller based on the classification data for the plurality of sellers.

18. The non-transitory machine-readable medium of claim 17, wherein the operations further comprise: alerting the incorrectly classified seller to update a characteristic in a profile of the incorrectly classified seller.

19. The non-transitory machine-readable medium of claim 15, wherein the operations further comprise: determining an updated classification for at least one seller based on updated transaction log data from a subsequent time period.

20. The non-transitory machine-readable medium of claim 15, wherein the operations further comprise: determining a maximum pointwise mutual information value between each of the classifications of the plurality of sellers to determine a relative reliability of the determined classification for the first seller.

* * * * *